(12) United States Patent
Braun et al.

(10) Patent No.: US 10,612,609 B2
(45) Date of Patent: Apr. 7, 2020

(54) MECHANICAL FRONT WHEEL DRIVE ROLLER WEDGING CONTROL SYSTEM

(71) Applicant: Deere & Company, Moline, IL (US)

(72) Inventors: Jesse A. Braun, Mayville, WI (US); Jeffrey A. Lawrence, Hartford, WI (US)

(73) Assignee: DEERE & COMPANY, Moline, IL (US)

( * ) Notice: Subject to any disclaimer, the term of this patent is extended or adjusted under 35 U.S.C. 154(b) by 138 days.

(21) Appl. No.: 15/888,319

(22) Filed: Feb. 5, 2018

(65) Prior Publication Data

US 2019/0242444 A1    Aug. 8, 2019

(51) Int. Cl.
| | |
|---|---|
| F16D 48/06 | (2006.01) |
| F16D 41/067 | (2006.01) |
| F16D 28/00 | (2006.01) |
| B60K 17/34 | (2006.01) |
| B60K 17/02 | (2006.01) |
| B60K 17/26 | (2006.01) |
| F16D 121/20 | (2012.01) |

(52) U.S. Cl.
CPC ........... *F16D 48/064* (2013.01); *B60K 17/02* (2013.01); *B60K 17/26* (2013.01); *B60K 17/34* (2013.01); *F16D 28/00* (2013.01); *F16D 41/067* (2013.01); *F16D 2121/20* (2013.01); *F16D 2500/10431* (2013.01); *F16D 2500/10493* (2013.01); *F16D 2500/3067* (2013.01); *F16D 2500/3144* (2013.01); *F16D 2500/31493* (2013.01)

(58) Field of Classification Search
CPC . F16D 2500/10431; F16D 2500/10493; F16D 2500/3067; F16D 2500/3144; F16D 2500/31453; F16D 2500/31493; F16D 48/064

See application file for complete search history.

(56) References Cited

U.S. PATENT DOCUMENTS

| | | |
|---|---|---|
| 4,559,846 A | 12/1985 | Cochran et al. |
| 4,747,462 A | 5/1988 | Herrmann et al. |
| 5,025,902 A | 6/1991 | Imai et al. |
| 5,036,939 A | 8/1991 | Johnson et al. |
| 5,971,123 A | 10/1999 | Ochab et al. |
| RE38,012 E | 3/2003 | Ochab et al. |
| 6,622,837 B2 | 9/2003 | Ochab et al. |
| 6,629,590 B2 | 10/2003 | Ochab et al. |
| 6,659,256 B2 | 12/2003 | Seki et al. |
| 7,234,553 B2 * | 6/2007 | Shimizu ............... B60K 6/44 180/65.25 |
| 7,350,632 B2 | 4/2008 | Houtman et al. |
| 7,938,041 B1 | 5/2011 | Shiigi et al. |
| 8,312,792 B1 | 11/2012 | Kochidomari et al. |
| 8,840,514 B1 | 9/2014 | Knickerbocker et al. |

(Continued)

*Primary Examiner* — David R Morris

(57) ABSTRACT

A mechanical front wheel drive roller wedging control system includes a 4WD switch in a vehicle operator station, a roller cage drag mechanism electrically activated by the 4WD switch and providing a drag on a roller cage if the 4WD switch is in an on position, and a throttle pedal switch actuated by the throttle pedal and that deactivates the roller cage drag mechanism when the throttle pedal is released. In an alternative embodiment, a controller may deactivate the roller cage drag mechanism when a throttle position sensor or engine speed sensor is below a minimum value.

6 Claims, 4 Drawing Sheets

(56) References Cited

U.S. PATENT DOCUMENTS

| | | |
|---|---|---|
| 9,719,567 B2 | 8/2017 | Lawrence et al. |
| 2004/0040759 A1* | 3/2004 | Shimizu ............ B60K 6/44 180/65.225 |
| 2012/0152686 A1 | 6/2012 | Brewer et al. |
| 2013/0112520 A1 | 5/2013 | Heath et al. |
| 2013/0199886 A1 | 8/2013 | Heath et al. |
| 2014/0038763 A1 | 2/2014 | Knickerbocker et al. |

\* cited by examiner

MECHANICAL FRONT WHEEL DRIVE ROLLER WEDGING CONTROL SYSTEM

FIELD OF THE INVENTION

This invention relates to utility vehicles and other off road machines having a mechanical front wheel drive (MFWD). More specifically, the invention relates to an MFWD control system to prevent wedging of rollers in roller clutches.

BACKGROUND OF THE INVENTION

Utility vehicles and other off road machines may have an MFWD to provide power to the front wheels if the rear wheels slip and lose traction. With the operator controlled 4WD switch in the on position, roller clutches in the front axle gear case will engage and provide drive to the front wheels if rear wheel speed is faster than front wheel speed. With no speed differential between the front and rear wheels, the front drive does not engage and the vehicle is driven by the rear wheels only.

With the 4WD switch in the on position and the transmission in either forward or reverse, voltage may be supplied to a roller cage drag mechanism such as a solenoid. The voltage is stopped when the machine is shifted into neutral. For example, if a solenoid is energized, a plunger may be extended into the path of the rotating tabs of an actuating washer, stopping the outer washer. Wave washers between the inner and outer washers place a drag between the outer (stopped) washer and the inner washer. The inner washer is keyed to a roller brake assembly which is connected to a roller cage by tabs.

The roller cage lies inside a ring gear hub. Each side of the roller cage contains cylindrical rollers that roll around the output hub to each axle. The rollers may be generally cylindrical or may have other geometries.

The drag imposed on the roller cage through the wave washers and tabs forces the rollers slightly off center in the openings of the roller cage. When the rear tires slip and spin more than about 15% faster than the front tires, the rollers move against ramps in the rotating ring gear hub and are forced inward. The inward movement presses the rollers against the left and right output hubs. At this point, all components begin rotating together.

Alternatively, the roller cage drag mechanism may be an electromagnet instead of a solenoid. The 4WD switch may energize an electromagnet that imposes drag on an armature plate, and through direct contact with the plate, to the roller cage.

When the vehicle stops and the operator shifts the transmission from forward to reverse, the voltage to the roller cage drag mechanism is momentarily stopped (neutral switch opened). This allows the springs on each roller to rotate the roller cage and rollers back into a neutral position.

However, certain driving maneuvers may allow the rollers to become wedged tightly between the ramps in the ring gear and output hub, and not move back to the neutral position. For example, in a reverse panic stop, an operator may drive the vehicle in reverse and then apply the brake suddenly to lock the front wheels and tires. High forces tend to push the rollers further up the ramps where they may become wedged against the output hub. Rollers also may become wedged by driving the vehicle up a sloped surface in forward or reverse, then allowing it to roll back down without applying the brakes or shifting the transmission out of forward or reverse.

If a vehicle is driven with wedged rollers, the vehicle drive train may be damaged by high sustained torque transferred through the driveshaft. For example, driveshaft components including the CV joint may be damaged. A mechanical front wheel drive roller wedging control system is needed to prevent wedging of rollers between the ramps in the ring gear and the output hub.

SUMMARY OF INVENTION

A mechanical front wheel drive roller wedging control system includes a roller cage drag mechanism activated by a 4WD switch to drive at least one front wheel if rear wheel slip occurs, and a throttle pedal switch to deactivate the roller cage drag mechanism when the throttle pedal is released. The system prevents wedging of rollers between the ramps in the ring gear and the output hub.

DESCRIPTION OF THE PREFERRED EMBODIMENT

Figure 1:
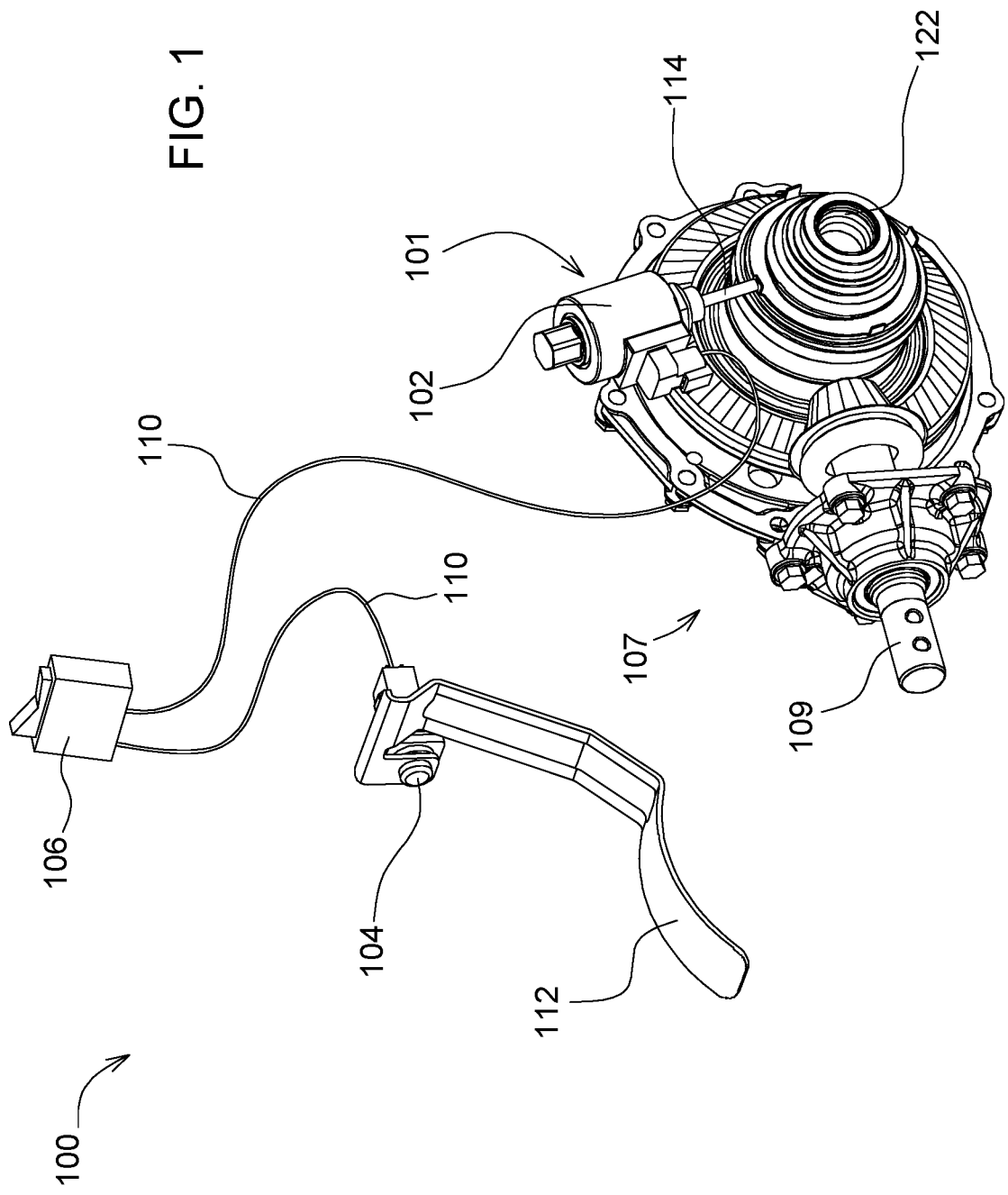
FIG. 1 is a perspective view of a mechanical front wheel drive roller wedging control system, partially in cross section, according to a first embodiment of the invention.
Figure 2:
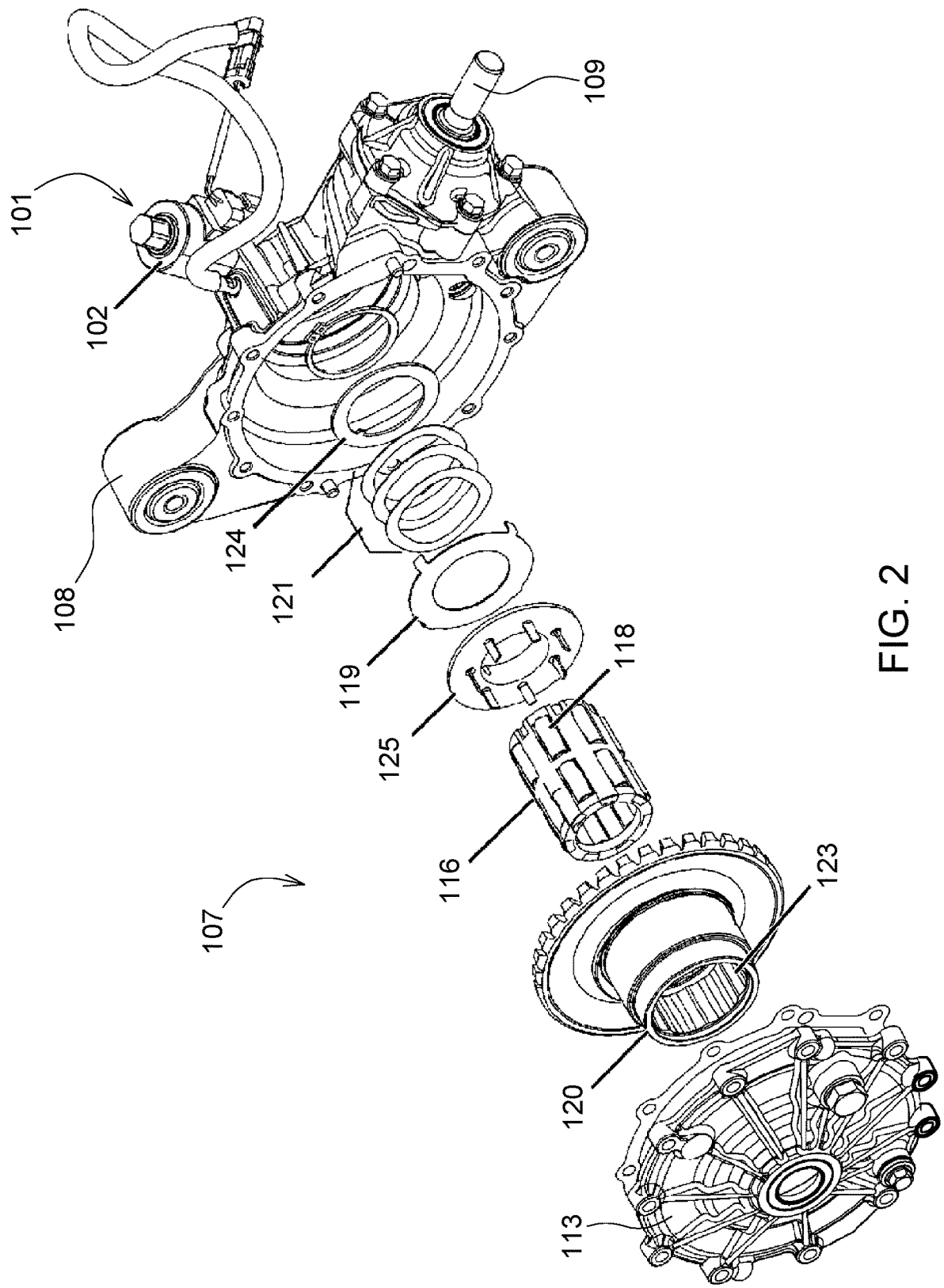
FIG. 2 is an exploded perspective view of a MFWD system with the mechanical front wheel drive roller wedging control system according to a first embodiment of the invention.

In a first embodiment shown in FIGS. 1-2, MFWD roller wedging control system 100 includes roller cage drag mechanism 101, throttle pedal switch 104, and 4WD switch 106. The roller cage drag mechanism may be attached or mounted to the MFWD system 107. Throttle pedal switch 104 may be provided on or adjacent throttle pedal 112. 4WD switch 106 may be located on the dash or operator station of the utility vehicle. Electrical wiring harness 110 may connect the roller cage drag mechanism, throttle pedal switch and 4WD switch in a circuit connected with a power supply on the vehicle. When the 4WD switch is in the on position and the throttle pedal switch is actuated by depressing the throttle pedal, electrical power may be provided through the circuit to activate the roller cage drag mechanism.

In one embodiment, the MFWD system 107 may include a roller cage 116 with a plurality of cylindrical rollers 118, or rollers having other geometries. Each side of the roller cage contains rollers 118 that roll around an output hub 122 to each axle. The roller cage lies inside a ring gear hub 120, which may be mounted inside a housing 108 and enclosed by a cover plate 113. Extension 109 may be connected to the front driveshaft.

In one embodiment, the operator may use 4WD switch 106 to electrically activate roller cage drag mechanism 101. The drag mechanism imposes drag on the roller cage 116 to force the rollers 118 slightly off center in the openings of the roller cage. When the rear tires slip and spin more than about 15% faster than the front tires, the rollers move against ramps 123 in the rotating ring gear hub 120 and are forced inward. The inward movement presses the rollers against the left and right output hubs 122.

In one embodiment, the roller cage drag mechanism may be a solenoid 102. The solenoid may include plunger 114 that may be extended to engage rotating tabs of the outer or actuating washer 119 when the solenoid is powered. When the extended plunger engages the tabs of outer or actuating washer 119, wave washers 121 place a drag between the outer (stopped) washer 119 and the inner washer 124. The inner washer may be keyed to a roller brake assembly 125 which is connected to roller cage 116 by tabs.

In one embodiment, if the operator releases the throttle pedal 112, the throttle pedal switch 104 cuts power to the roller cage drag mechanism. If the roller cage drag mechanism is a solenoid, plunger 114 may be retracted out of engagement with the outer or actuating washer 119. As a result, wave washers 121 stop imposing a drag on the roller cage 116, and the rollers 118 move back to the neutral position before they become wedged between the ramps 123 in ring gear 120 and the output hubs 122. The plunger 114 may remain in the retracted position and the rollers cannot reengage the output hub 122 until the operator depresses the throttle pedal again to actuate the throttle pedal switch while the 4WD switch 106 remains on.

In a second or alternative embodiment, the roller cage drag mechanism may include an electromagnet. When the 4WD switch is in the on position and the throttle pedal switch is actuated by depressing the throttle pedal 112, electrical power may be provided through a circuit to the electromagnet. The electromagnet may impose drag on an armature plate, and through direct contact with the plate, to the roller cage. If the operator releases the throttle pedal 112, the throttle pedal switch 104 cuts power to the electromagnet. The electromagnet releases the armature plate, which stops imposing a drag on the roller cage 116, and the rollers 118 move back to the neutral position before they become wedged between ramps 123 in the ring gear 120 and the output hub 122. The armature plate stays released and the rollers cannot move back up the ramps 123 to engage the output hubs 122 until the operator depresses the throttle pedal again to actuate the throttle pedal switch again while the 4WD switch 106 is on.

The MFWD roller wedging control system may reduce or eliminate the roller wedging problem by employing a throttle pedal switch to cut power to a roller cage drag mechanism such as a solenoid or electromagnet before the rollers become wedged between the ring gear and output hubs. The throttle pedal switch cuts power immediately, and before an operator can apply vehicle brakes and before high forces urge the rollers into a wedged position.

Figure 3:
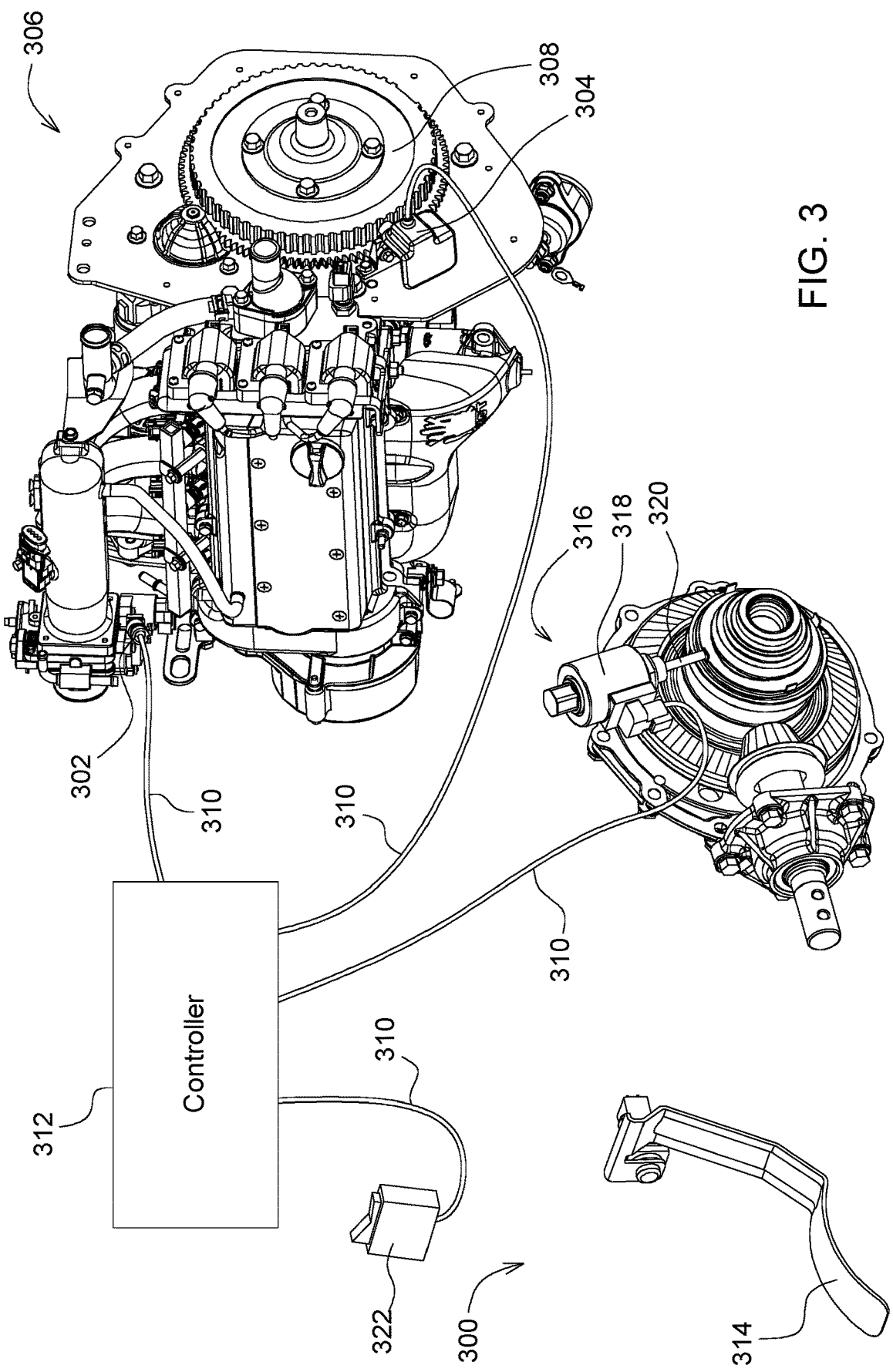
FIG. 3 is a perspective view of a mechanical front wheel drive roller wedging control system according to an alternative embodiment of the invention.

In an alternative embodiment shown in FIG. 3, MFWD roller wedging control system 300 may include throttle position sensor 302, and/or engine speed detector 304, both of which may mounted on or adjacent internal combustion engine 306. For example, as shown in FIG. 3, the engine speed detector for a gasoline engine may be a crank position sensor which determines engine speed by detecting rotation of the teeth or other markings on engine flywheel 308. Alternatively, an alternator may function as an engine speed detector on other utility vehicles or off road machines, including vehicles with diesel engines. In either case, throttle position sensor 302, engine speed detector 304, roller cage drag mechanism 316, and 4WD switch 322 may be connected through wiring harness 310 to electronic controller 312, in a circuit connected with a power supply on the vehicle. The controller 312 includes a microprocessor capable of receiving and processing signals and providing commands using software or logic, and may be an electronic engine control unit and/or instrument cluster controller, or a combination of these devices linked together for communication via CAN bus, or any other form of electronic controller. When the 4WD switch is in the on position and the throttle pedal switch is actuated by depressing the throttle pedal, electrical power may be provided through the circuit to activate the roller cage drag mechanism.

In an alternative embodiment, if throttle position sensor 302 detects throttle pedal 314 is pressed less than about 1% (which may be less than a minimum that indicates an operator is pressing the throttle pedal), or engine speed detector 304 shows engine speed is below about 2000 RPM (which may be less than a minimum engine speed that will move the vehicle forward up a slope), controller 312 may cut power to roller cage drag mechanism 316. For example, if the roller cage drag mechanism includes solenoid 318, the engine control unit may provide a signal to retract plunger 320 out of engagement with the outer or actuating washer. As a result, wave washers then may stop imposing a drag on the roller cage, and rollers may move back to the neutral position before they become wedged between the ramps in the ring gear and the output hubs. The plunger may remain in the retracted position and the rollers cannot reengage the output hub until the throttle position sensor detects the throttle pedal is depressed at least about 1%, and the engine speed detector indicates an engine speed of at least about 2300 RPM, while the 4WD switch remains on. When these conditions are satisfied, the engine control unit may enable electric power to the roller cage drag mechanism again.

In another alternative embodiment, the MFWD roller wedging control system may include a throttle switch as shown in FIG. 1 along with an engine speed sensor, both of which may be included in or connected to a controller with a microprocessor, on a utility vehicle or other off road machine having a diesel engine. If the throttle switch is not actuated because the throttle pedal is not pressed, or the engine speed sensor shows engine speed is less than about 2000 RPM (which may be less than a minimum value that will move the vehicle forward up a slope), the controller may cut power to the roller cage drag mechanism. For example, if the roller cage drag mechanism includes a solenoid, the controller may provide a signal to retract the plunger out of engagement with the outer or actuating washer. As a result, wave washers then may stop imposing a drag on the roller cage, and rollers may move back to the neutral position before they become wedged between the ramps in the ring gear and the output hubs. The plunger may remain in the retracted position and the rollers cannot reengage the output hub until the throttle switch is actuated (throttle pedal is pressed), and the engine speed detector indicates an engine speed of at least about 2300 RPM, while the 4WD switch remains on. When these conditions are satisfied, the controller may enable electric power to the roller cage drag mechanism again.

Figure 4:
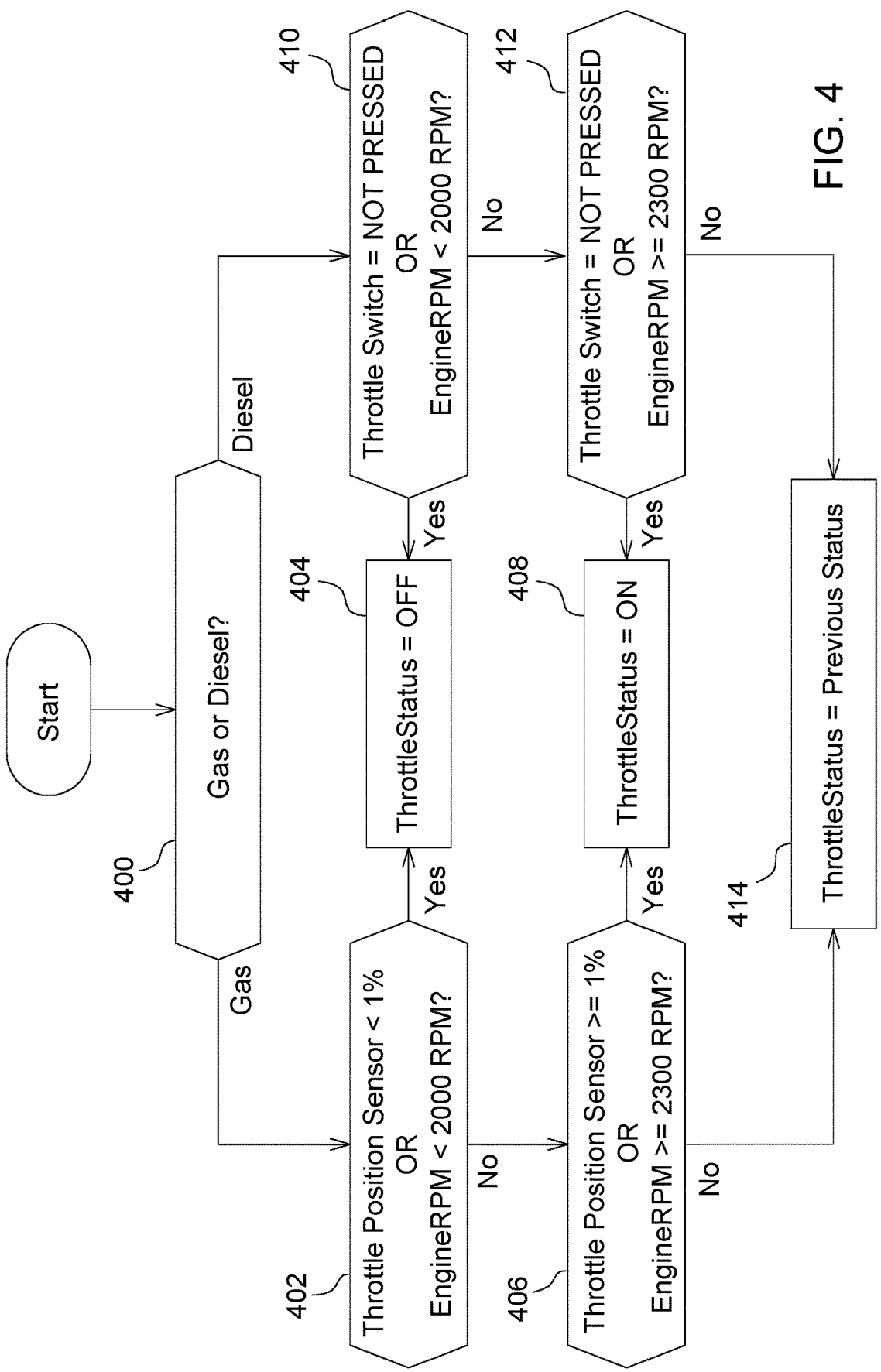
FIG. 4 is a block diagram of the controller logic of a mechanical front wheel drive roller wedging control system according to an alternative embodiment of the invention.

In another alternative embodiment, the MFWD roller wedging control system may include control logic for utility vehicles or other off road machines having either a gasoline or diesel engine. For example, in the logic diagram of FIG. 4, the controller may determine if the vehicle has a gas or diesel engine in block 400. If the engine is gas, in block 402 the controller may determine if the throttle position sensor indicates the throttle pedal is pressed less than about 1%, or if the engine speed sensor shows engine speed below about 2000 RPM. If so, the controller may set the throttle status to off in block 304, and cut power to the roller cage drag mechanism. However, if not, in block 306 the controller may determine if the throttle position sensor indicates the throttle pedal is pressed at least about 1% and the engine speed sensor shows engine speed at least about 2300 RPM. If so, the controller may set the throttle status to on in block 308, and provide power to the roller cage drag mechanism. If not, the controller may allow the throttle to remain at its previous status in block 314. If the engine is diesel, in block 310 the controller then may determine if the throttle switch is not actuated, or the engine speed sensor shows engine speed below about 2000 RPM. If so, the controller may set the throttle status to off in block 304, and cut power to the roller cage drag mechanism. However, if not, in block 312 the controller may determine if the throttle switch is actuated and the engine speed sensor shows engine speed at least about 2300 RPM. If so, the controller may set the throttle status to on in block 308, and provide power to the roller cage drag mechanism. If not, the controller may allow the throttle to remain at its previous status in block 314.

Having described the preferred embodiment, it will become apparent that various modifications can be made without departing from the scope of the invention as defined in the accompanying claims.

The invention claimed is:

1. A mechanical front wheel drive roller wedging control system, comprising:
    a 4WD switch in a vehicle operator station;
    a roller cage drag mechanism electrically activated by the 4WD switch and providing a drag on a roller cage to engage a rotating ring gear hub with a left output hub and a right output hub if the 4WD switch is in an on position;
    a throttle position sensor and an engine speed sensor; and
    a controller cutting power to the roller cage drag mechanism to disengage the rotating ring gear hub from the left output hub and the right output hub when the throttle position sensor detects a throttle pedal below a minimum throttle pedal position, or the engine speed sensor is below a minimum engine speed; and
    resuming power to the roller cage drag mechanism to reengage if the throttle position sensor detects the throttle pedal above the minimum throttle pedal position and the engine speed sensor is above the minimum engine speed.

2. The mechanical front wheel drive roller wedging control system of claim 1 wherein the roller cage drag mechanism includes a solenoid with a plunger, the controller cutting power to the solenoid when the throttle position sensor detects the throttle pedal is below the minimum throttle pedal position or the engine speed sensor is below the minimum engine speed.

3. A mechanical front wheel drive roller wedging control system, comprising:
    a solenoid having a plunger extending to engage an actuating washer to impose a drag on a roller cage having a plurality of rollers that are engageable between a ring gear hub and an output hub of a mechanical front wheel drive system; and
    a controller cutting power to the solenoid for retracting the plunger when a throttle position sensor detects the throttle pedal is below a minimum position or an engine speed sensor is below a minimum engine speed before any wedging of the rollers between the ring gear hub and the output hub; and
resuming power to the solenoid to extend the plunger if the throttle position sensor detects the throttle pedal has returned to a specified position above the minimum position and the engine speed sensor has returned to a specified engine speed above the minimum engine speed.

4. The mechanical front wheel drive roller wedging control system of claim 3 wherein the solenoid is electrically actuated by a 4WD switch.

5. A mechanical front wheel drive roller wedging control system, comprising:
    a roller cage drag mechanism activated by a 4WD switch to drive at least one front wheel if rear wheel slip occurs;
    a controller cutting power to the roller cage drag mechanism when a throttle position sensor detects a throttle pedal is pressed less than a minimum or an engine speed sensor is below a minimum engine speed; and
    returning power to the roller cage drag mechanism if the throttle position sensor detects the throttle pedal is pressed at least the minimum and the engine speed sensor is above the minimum engine speed.

6. The mechanical front wheel drive roller wedging control system of claim 5 wherein the roller cage drag mechanism is a solenoid with a plunger.

* * * * *